(12) United States Patent
Takagi et al.

(10) Patent No.: US 11,101,588 B2
(45) Date of Patent: Aug. 24, 2021

(54) TERMINAL INCLUDING AN INSULATION PORTION

(71) Applicant: Yazaki Corporation, Tokyo (JP)

(72) Inventors: Akiyoshi Takagi, Shizuoka (JP); Tomoharu Suzuki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/437,251

(22) Filed: Jun. 11, 2019

(65) Prior Publication Data

US 2019/0386416 A1 Dec. 19, 2019

(30) Foreign Application Priority Data

Jun. 15, 2018 (JP) .............................. JP2018-114269

(51) Int. Cl.
| | |
|---|---|
| H01R 33/00 | (2006.01) |
| H01R 13/04 | (2006.01) |
| B60L 53/16 | (2019.01) |
| H01R 13/405 | (2006.01) |
| H01R 13/422 | (2006.01) |
| H01R 13/506 | (2006.01) |
| H01R 13/629 | (2006.01) |
| H01R 24/66 | (2011.01) |

(52) U.S. Cl.
CPC .............. *H01R 13/04* (2013.01); *B60L 53/16* (2019.02); *H01R 13/405* (2013.01); *H01R 13/4223* (2013.01); *H01R 13/506* (2013.01); *H01R 13/629* (2013.01); *H01R 24/66* (2013.01)

(58) Field of Classification Search
CPC ...... H01R 13/04; H01R 24/66; H01R 13/629; H01R 13/506; H01R 13/4223; H01R 13/405; H01R 2201/26; H01R 13/4226; B60L 53/16
USPC ........................................................ 439/884
See application file for complete search history.

(56) References Cited

U.S. PATENT DOCUMENTS

| | | | |
|---|---|---|---|
| 4,864,721 A | 9/1989 | Rudy, Jr. et al. | |
| 5,224,875 A | 7/1993 | Watanabe et al. | |
| 6,102,717 A * | 8/2000 | Aoki ................... | H01R 13/193 439/157 |
| 6,755,696 B1 | 6/2004 | Ko | |
| 8,387,466 B2 * | 3/2013 | Shinohara .............. | B60T 8/368 73/756 |
| 9,312,626 B2 * | 4/2016 | Itsuki ................. | H01R 13/5208 |
| 9,379,478 B2 * | 6/2016 | Fabre ................. | H01R 13/6581 |
| 9,444,167 B2 | 9/2016 | Fukushima et al. | |
| 9,692,171 B2 * | 6/2017 | Suzuki .............. | H01R 13/5205 |

(Continued)

FOREIGN PATENT DOCUMENTS

| | | |
|---|---|---|
| CN | 2689506 Y | 3/2005 |
| CN | 106785595 A | 5/2017 |
| JP | 2014-072169 A | 4/2014 |

*Primary Examiner* — Abdullah A Riyami
*Assistant Examiner* — Nelson R. Burgos-Guntin
(74) *Attorney, Agent, or Firm* — Sughrue Mion, PLLC (57) ABSTRACT

A terminal includes: a terminal main body having an electrical conductivity, and including a contact portion; and an insulation member which includes a terminal holding portion which is arranged on a rear end side of the contact portion and held in the housing. The terminal holding portion includes a rotation prevention portion which is engaged with a locking portion formed in the housing to prevent rotation of the terminal in the housing.

7 Claims, 10 Drawing Sheets

(56) References Cited

U.S. PATENT DOCUMENTS

| | | | |
|---|---|---|---|
| 9,917,396 B2* | 3/2018 | Horiuchi | H01R 13/5227 |
| 10,468,811 B2* | 11/2019 | Endo | B60L 53/18 |
| 10,559,919 B2* | 2/2020 | Masuda | H01R 13/4365 |
| 2004/0134544 A1* | 7/2004 | Mikiya | F16L 37/47 |
| | | | 137/616.7 |
| 2008/0194129 A1* | 8/2008 | Ikeya | H01R 13/631 |
| | | | 439/157 |
| 2012/0021645 A1* | 1/2012 | Marsh | H01R 11/12 |
| | | | 439/578 |
| 2012/0100753 A1* | 4/2012 | Omae | H01R 13/5202 |
| | | | 439/588 |
| 2012/0252272 A1* | 10/2012 | Omae | H01R 13/506 |
| | | | 439/607.01 |
| 2014/0187104 A1* | 7/2014 | Chamura | H01R 13/639 |
| | | | 439/725 |
| 2014/0206213 A1* | 7/2014 | Kato | H01R 13/62 |
| | | | 439/157 |
| 2015/0200481 A1 | 7/2015 | Fukushima et al. | |
| 2015/0380859 A1* | 12/2015 | Sekino | G01L 23/26 |
| | | | 439/660 |
| 2016/0093972 A1* | 3/2016 | Akagi | H01R 13/502 |
| | | | 439/660 |
| 2018/0062298 A1 | 3/2018 | Mogi et al. | |
| 2018/0248292 A1* | 8/2018 | Hashiguchi | H01R 13/436 |
| 2018/0248436 A1* | 8/2018 | Imazawa | H02K 1/243 |
| 2019/0193003 A1* | 6/2019 | Boutin | B01D 29/21 |
| 2020/0144758 A1* | 5/2020 | Itou | H01R 13/506 |

* cited by examiner

TERMINAL INCLUDING AN INSULATION PORTION

CROSS REFERENCE TO RELATED APPLICATIONS

The present application claims priority to Japanese Patent Application No. 2018-114269 filed on Jun. 15, 2018, the entire contents of which are incorporated by reference herein.

BACKGROUND

Technical Field

The present invention relates to a terminal which includes an insulation portion at a distal end.

Related Art

Conventionally, there is a known terminal which is fixed in a housing. The known terminal includes a terminal main body, a distal end insulation portion, a terminal holding portion, and an intermediate resin portion (see JP 2014-72169 A). The terminal main body has an electrical conductivity, and includes a contact portion at which a communication portion extending in an axial direction is formed. The distal end insulation portion protrudes toward a front of a distal end of the contact portion. The terminal holding portion is arranged on a rear end side of the contact portion, and fixes the terminal main body. The intermediate resin portion is arranged at the communication portion, and couples the distal end insulation portion and the terminal holding portion.

SUMMARY

In the conventional terminal, the terminal main body, the distal end insulation portion and the terminal holding portion are formed in columnar shapes. Consequently, it is possible to secure a sealing property (waterproof property) between the conventional terminal and the housing in which the conventional terminal is fixed. Specifically, it is possible to secure the sealing property by installing an annular sealing member to the terminal holding portion. However, the terminal rotates with respect to the housing (i.e., the terminal rotates about a center axis of the above column) in some cases.

An object of the present invention is to provide a terminal which is fixed in a housing, and can be prevented from rotating with respect to the housing when fixed in the housing.

A terminal according to one aspect of the present invention includes: a terminal main body having an electrical conductivity, and including a contact portion; and an insulation member which includes a terminal holding portion which is arranged on a rear end side of the contact portion and fixes the terminal main body in the housing, and the terminal holding portion is provided with a rotation prevention portion which is engaged with a locking portion formed in the housing to prevent rotation of the terminal when the terminal is fixed in the housing.

The present invention is a terminal which is fixed in a housing and used, and can be prevented from rotating with respect to the housing when fixed in the housing.

DETAILED DESCRIPTION

Terminals 1 according to an embodiment of the present invention are used as, for example, terminals (male terminals) of a connector 2 of a charging inlet device 3, and are fixed in a housing 5 of the connector 2 of the charging inlet device 3 and used as illustrated in FIGS. 1 to 7.

The charging inlet device 3 is fixed in a vehicle (not illustrated) and used. The charging inlet device 3 is fitted to a charging connector (not illustrated) such as a charging stand, and receives power via the charging connector.

In this regard, for ease of description, one predetermined direction in a space is a front-back direction, one predetermined direction perpendicular to the front-back direction is a traverse direction, and a direction perpendicular to the front-back direction and the traverse direction is referred to as a vertical direction.

Figure 8:
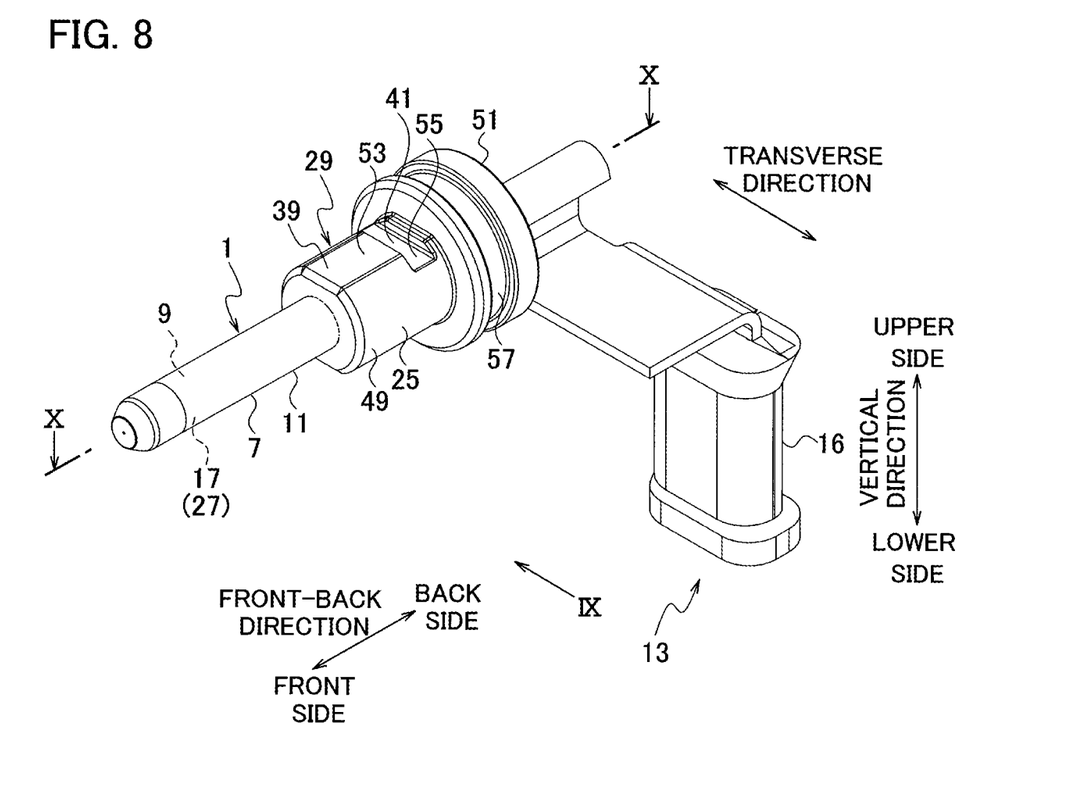
FIG. 8 is a perspective view of the terminal according to the embodiment of the present invention.
Figure 9:
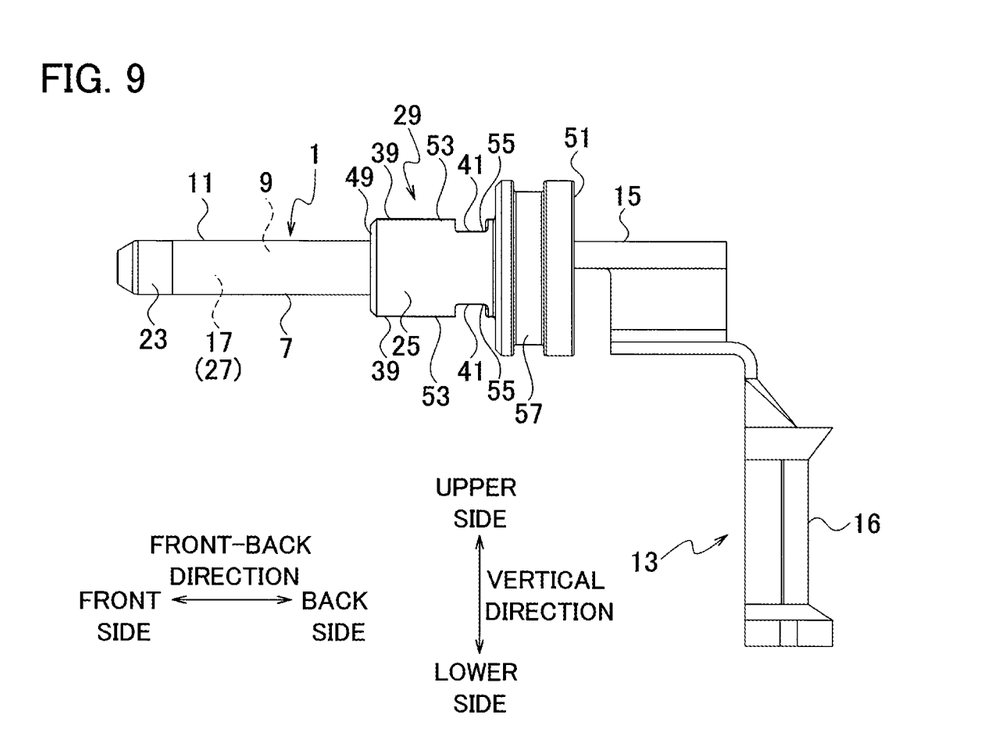
FIG. 9 is a IX arrow view in FIG. 8.
Figure 10:
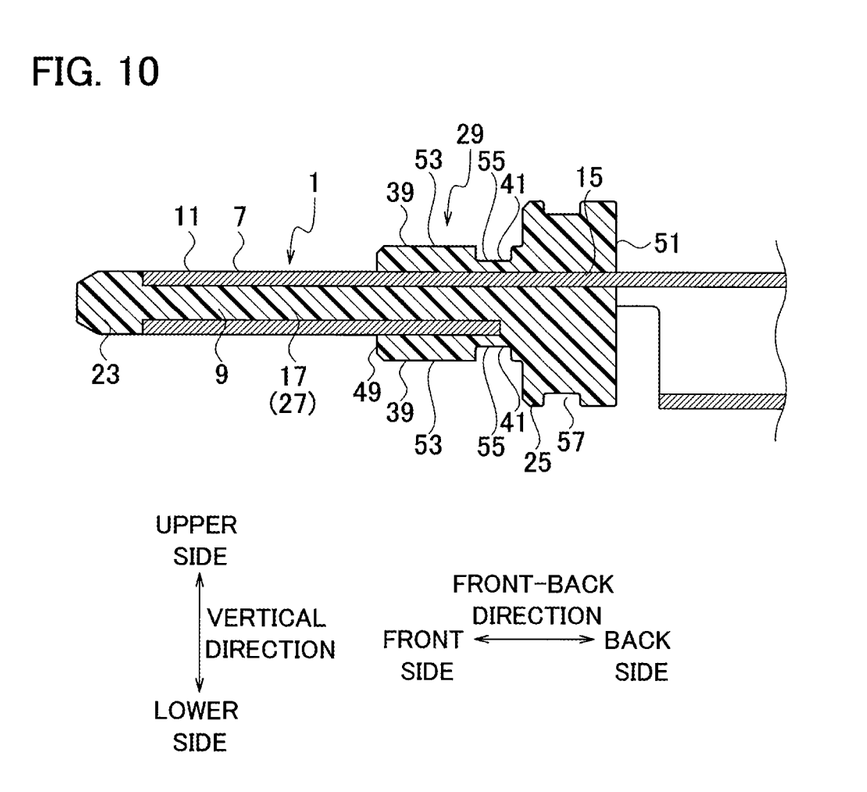
FIG. 10 is an X-X cross-sectional view in FIG. 8.

As illustrated in FIGS. 8 to 10, the male terminal 1 includes a terminal main body 7 having an electrical conductivity, and an insulation resin portion 9 fixed to the terminal main body 7. The terminal main body 7 is formed by bending an electrically-conductive plate of a predetermined shape by press working.

The terminal main body 7 includes a contact portion 11 which contacts a female terminal (not illustrated) of the other terminal, a cable connection portion 13 and a coupling portion 15 which couples these portions. The contact portion 11 is formed in a cylinder shape (cylindrical shape) provided with a through-hole 17 as a communication portion which extends in an axial direction (front-back direction). The cable connection portion 13 includes a pair of crimping pieces 16. A relay cable 21 is cramped with corresponding one of the crimping pieces 16 and is connected to the cable connection portion 13 (see FIG. 6).

The insulation resin portion (insulation member) 9 includes a distal end insulation portion 23, a terminal holding portion 25, and an intermediate resin portion 27. The distal end insulation portion 23 protrudes toward a front of a distal end (front end) of the contact portion 11. The terminal holding portion 25 is arranged on a rear side of the contact portion 11 and held in the housing 5 which is integrally molded using a resin. The intermediate resin portion 27 is arranged in the through-hole 17 of the contact portion 11 (i.e., arranged inside the contact portion 11) and couples the distal end insulation portion 23 and the terminal holding portion 25.

As illustrated in FIGS. 7 to 10, the terminal holding portion 25 of the terminal 1 includes a rotation prevention portion (rotation prevention portion) 29. The rotation prevention portion 29 of the terminal 1 is engaged with locking portions (lock claws) 31 formed in the housing 5 when the terminal 1 is installed in the housing 5 (e.g., while the terminal 1 is being installed or at a point of time at which installation of the terminal 1 is finished). Furthermore, the terminal 1 is prevented from rotating about the center axis of the contact portion 11 of the cylinder shape.

In addition, the center axis of the contact portion 11 extends in a movement direction (front-back direction) of the terminal 1 while the terminal 1 is installed in the housing 5.

The locking portion 31 of the housing 5 includes a bar-shaped arm portion 35 which extends from a main body portion 33 of the housing and has flexibility, and a locking claw portion 37 which is formed at a distal end of this arm portion 35.

The rotation prevention portion 29 includes a first engaged portion (first locked portion) 39 and a second engaged portion (second locked portion) 41. The first engaged portion is engaged with the locking claw portion 37 in a state while the terminal 1 is being fixed in the housing 5, and prevents rotation of the terminal 1. The second engaged portion 41 is engaged with the locking claw portion 37 when installing of the terminal 1 into the housing 5 is finished, and prevents detachment of the terminal 1 from the housing 5.

Furthermore, when installing of the terminal 1 into the housing 5 is finished, the locking claw portion 37 of the locking portion 31 of the housing 5 is engaged with the second engaged portion 41 to prevent detachment of the terminal 1 and prevent rotation of the terminal 1.

In addition, there may be employed a configuration where, when installing of the terminal 1 into the housing 5 is finished, the arm portion 35 of the locking portion 31 of the housing 5 is engaged with (contacts) the first engaged portion 39 to prevent rotation of the terminal 1.

Furthermore, the terminal holding portion 25 is provided with a sealing portion (water stop portion) 43 which seals between the housing 5 and the terminal holding portion 25 when the terminal 1 is installed in the housing 5.

The sealing portion 43 is formed on a rear side of the rotation prevention portion 29 in a movement direction (the movement direction of the terminal with respect to the housing) in which the terminal 1 moves from the rear side to the front side of the terminal 1 when the terminal 1 is installed in the housing 5.

As seen from the movement direction (front-back direction) of the terminal 1 in the installation of the terminal 1 into the housing 5, the locking portion 31 of the housing 5 and the rotation prevention portion 29 are located inside the sealing portion 43 while the terminal 1 is being installed into the housing 5 or when installing of the terminal 1 into the housing 5 is finished.

Hereinafter, the terminal 1 will be described in more detail. The terminal 1 includes the terminal main body 7 and the insulation member 9.

The terminal main body 7 includes the cylindrical portion (contact portion) 11, a core holding portion (part of the cable connection portion 13) 45, a sheath holding portion (the other part of the cable connection portion 13) 47, and the coupling portion 15. The core holding portion 45 holds a core 22 of a cable (relay cable) 21. The sheath holding portion 47 holds a sheath (the sheath which covers the core 22) of the cable 21. The coupling portion 15 is located between the cylindrical portion 11 and the core holding portion 45, and couples the cylindrical portion 11 and the core holding portion 45.

The insulation member 9 includes the front end insulation portion (a front side insulation portion; a distal end insulation portion) 23, the intermediate insulation portion (intermediate resin portion) 27 and the rear end insulation portion (a rear side insulation portion; a terminal holding portion) 25.

The front end insulation portion 23 is formed in a columnar shape, and slightly protrudes from a front end (an end on a side opposite to the coupling portion 15 and the core holding portion 45) of the cylindrical portion 11 of the terminal main body 7. The intermediate insulation portion 27 is filled inside the cylindrical portion 11 of the terminal main body 7.

The rear end insulation portion 25 is provided to a rear end portion of the cylindrical portion 11 of the terminal main body 7 and a front end portion of the coupling portion 15 of the terminal main body 7. The rear end insulation portion 25 covers the rear end portion of the cylindrical portion 11 of the terminal main body 7 and the front end portion of the coupling portion 15 of the terminal main body 7.

A value of the outer diameter of the front end insulation portion 23 and a value of the outer diameter of the cylindrical portion 11 of the terminal main body 7 are equal to each other. The center axis of the front end insulation portion 23 and the center axis of the cylindrical portion 11 of the terminal main body 7 match with each other. The front end insulation portion 23, the intermediate insulation portion 27 and the rear end insulation portion 25 are integrally formed.

The rear end insulation portion 25 includes a first columnar part 49 which is located on a side (front side) of the front end insulation portion 23, and a second columnar part 51 which is located on a side (rear side) of the core holding portion 45. In other words, the rear end insulation portion 25 includes the first columnar part 49 which is located on the side opposite to the core holding portion 45, and the second columnar part 51 which is located on the side of the core holding portion 45.

The outer diameter of the first columnar part 49 is larger than the outer diameter of the cylindrical portion 11 of the terminal main body 7. The outer diameter of the second columnar part 51 is larger than the outer diameter of the first columnar part 49. The center axis of the first columnar part 49 and the center axis of the second columnar part 51 match with each other, and match with the center axis of the front end insulation portion 23 and the center axis of the cylindrical portion 11 of the terminal main body 7.

At front side portions of the first columnar part 49 located on the side (front side) of the front end insulation portion 23, a pair of first planar portions 53 parallel to the center axis of the first columnar part 49 are formed. A pair of first planar portions 53 form the first engaged portion 39. Furthermore, a pair of first planar portions 53 are parallel to each other, and are located mutually symmetrically with respect to the center axis of the first columnar part 49 (distances from the center axis are equal to each other).

At rear side portions of the first columnar part 49 located on the side (rear side) of the core holding portion 45, a pair of second planar portions 55 parallel to the first planar portions 53 are formed. A pair of second planar portions 55 form the second engaged portion 41. Furthermore, a pair of second planar portions 55 are mutually symmetrical with respect to the center axis of the first columnar part, and a value of a distance between a pair of second planar portions 55 is smaller than a value of a distance between a pair of first planar portions 53.

At an intermediate portion in the front-back direction of the second columnar part 51, an annular recess portion 57 is formed. The center axis of the annular recess portion 57 and the center axis of the second columnar part 51 match with each other. A sealing member 59 such as an O ring which forms the sealing portion 43 is attached into the annular recess portion 57.

When a state where the terminal 1 is being installed into the housing 5 or installation of the terminal 1 into the housing 5 is finished is seen from an extension direction (the front-back direction; the movement direction of the terminal 1 with respect to the housing 5 when the terminal 1 is installed in the housing 5) of the center axes of the first columnar part 49 and the second columnar part 51, the locking portions 31 of the housing 5 are located inside the second columnar part 51. Furthermore, the first planar portions 53 and the second planar portions 55 are located between the locking portions 31.

The housing 5 includes the main body portion 33 of the housing and the locking portions 31 as described above.

A space 60 in which the terminals 1 and the cables 21 enter is formed inside the main body portion 33 of the housing. In the space 60, a first part 61 of a columnar shape, a second part 63 of a columnar shape, a third part 65 of a columnar shape and a fourth part 67 of a columnar shape are connected with each other in order from the front to the rear and aligned. In addition, a rear end of the main body portion 33 of the housing is opened.

The center axis of the first part 61, the center axis of the second part 63 and the center axis of the third part 65 match with each other. In a state where the terminal 1 is installed, the center axis of the first part 61 and the center axis of the cylindrical portion 11 match with each other.

The inner diameter of the first part 61 is larger than the outer diameter of the cylindrical portion 11 of the terminal 1. The inner diameter of the second part 63 is smaller than the inner diameter of the first part 61. The inner diameter of the third part 65 is larger than the inner diameter of the second part 63.

The inner diameter of the second part 63 is equal to or slightly larger than the inner diameter of the first columnar part 49. The inner diameter of the third part 65 is equal to or slightly larger than the inner diameter of the second columnar part 51.

The locking portions 31 of the housing 5 are formed at the second part 63. Furthermore, the one locking portion 31 of the housing 5 is formed at an upper portion of the second part 63 and the one locking portion 31 is formed at a lower portion of the second part 63 (a pair of the locking portions 31 are formed) for the one terminal 1 to meet a pair of first planar portions 53 and a pair of second planar portions 55. That is, according to an aspect where the two terminals 1 are installed, the four locking portions 31 are formed in the one housing 5.

First, an upper locking portion 31A will be described. The locking portion 31A is formed in a cantilever shape, and extends rearward from a portion of a part slightly on the rear side of a boundary of the first part 61 and the second part 63. A distal end (rear end) of the locking portion 31A is located slightly on the front side of a boundary of the second part 63 and the third part 65. Furthermore, a gap 69 which isolates the locking portion 31A from the main body portion 33 of the housing (i.e., which forms the locking portion 31A) is formed around the locking portion 31A.

The arm portion 35 of the locking portion 31A is formed in a rectangular flat plate shape, a thickness direction matches with the vertical direction, a width direction matches with a traverse direction, and a longitudinal direction (extension direction) matches with the front-back direction. A base end (front end) of the arm portion 35 of the locking portion 31A is integrally formed with the main body portion 33 of the housing.

The locking claw portion 37 of the locking portion 31A is formed at a distal end (rear end) of the arm portion 35 of the locking portion 31A. Furthermore, the locking claw portion 37 of the upper locking portion 31A protrudes toward the terminal 1 (a lower side: a side of the center axis of the column second part 63) compared to the arm portion 35 of the locking portion 31A.

A value of a thickness dimension of the arm portion 35 of the locking portion 31A is smaller than a value of a width dimension of the arm portion 35 of the locking portion 31A. A value of the width dimension of the arm portion 35 of the locking portion 31A is smaller than a value of a length direction of the arm portion 35 of the locking portion 31A.

Thus, the arm portion 35 of the locking portion 31A warps in the vertical direction in a manner of a cantilever when the locking claw portion 37 of the locking portion 31A receives a force in the vertical direction, and restores when a force is released.

The value of the width dimension of the locking portion 31A (the arm portion 35 and the locking claw portion 37) is substantially equal to values of width directions (dimensions in the traverse direction) of the first planar portions 53 formed at the first columnar part 49 of the terminal holding portion 25.

A lower locking portion 31B and the lower gap 69 are formed similar to the upper locking portion 31A, and are arranged symmetrically with respect to the center axis of the columnar second part 63 (a plane which includes the center axis and is perpendicular to the vertical direction).

Furthermore, in a state while the terminal 1 is being installed into the housing 5, the locking claw portion 37 of the locking portion 31A is in contact with the first planar portion (upper planar portion) 53 of the first columnar part 49 of the terminal holding portion 25, and the arm portion 35 of the locking portion 31A warps upward.

Simultaneously, the locking claw portion 37 of the locking portion 31B is in contact with the first planar portion (lower planar portion) 53 of the first columnar part 49 of the terminal holding portion 25, and the arm portion 35 of the locking portion 31B warps downward.

In this case, the locking claw portion 37 and the first planar portion 53 are in, for example, linear contact (contact with each other at a linear part which extends over the entire length in the traverse direction of the first columnar part 49), and the terminal 1 is sandwiched by a pair of locking portions 31 with a biasing force, so that rotation of the terminal 1 with respect to the housing 5 is prevented.

In a state where installing of the terminal 1 in the housing 5 is finished, the arm portion 35 of the locking portion 31A restores, and the locking claw portion 37 of the locking portion 31A enters the upper second planar portion 55 of the first columnar part 49. Simultaneously, the arm portion 35 of the locking portion 31B restores, and the locking claw portion 37 of the locking portion 31B enters the lower second planar portions 55 of the first columnar part 49, so that detachment of the terminal 1 from the housing 5 is prevented.

In addition, in a state where installing of the terminal 1 in the housing 5 is finished, the locking claw portion 37 and the second planar portions 55 are in, for example, linear contact, and rotation of the terminal 1 with respect to the housing 5 is prevented. Furthermore, the arm portion 35 may be configured to come into planar contact with the first planar portions 53 in the state where installing of the terminal 1 in the housing 5 is finished. Furthermore, rotation of the terminal 1 may be prevented.

Figure 1:
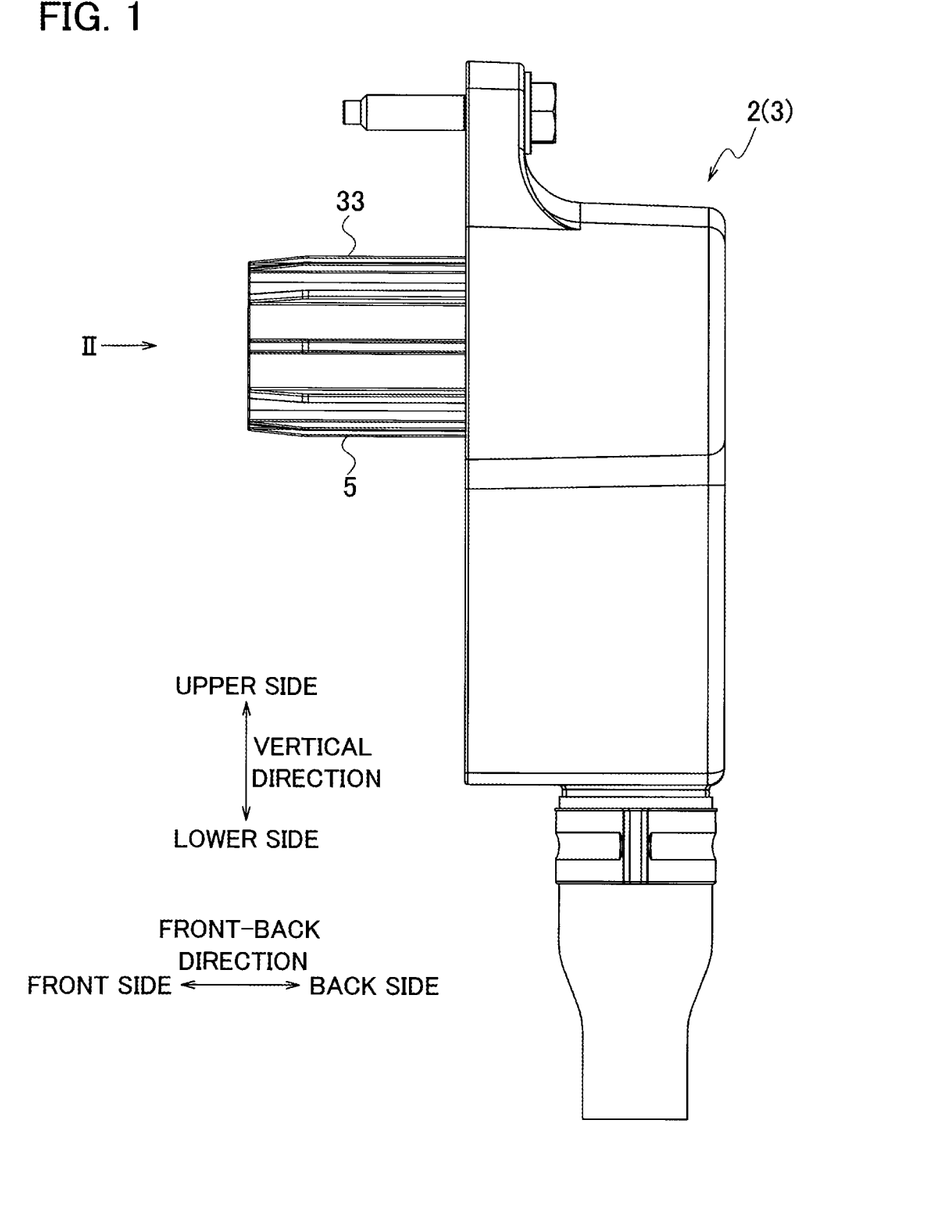
FIG. 1 is a side view of a housing in which terminals according to an embodiment of the present invention are fixed.
Figure 2:
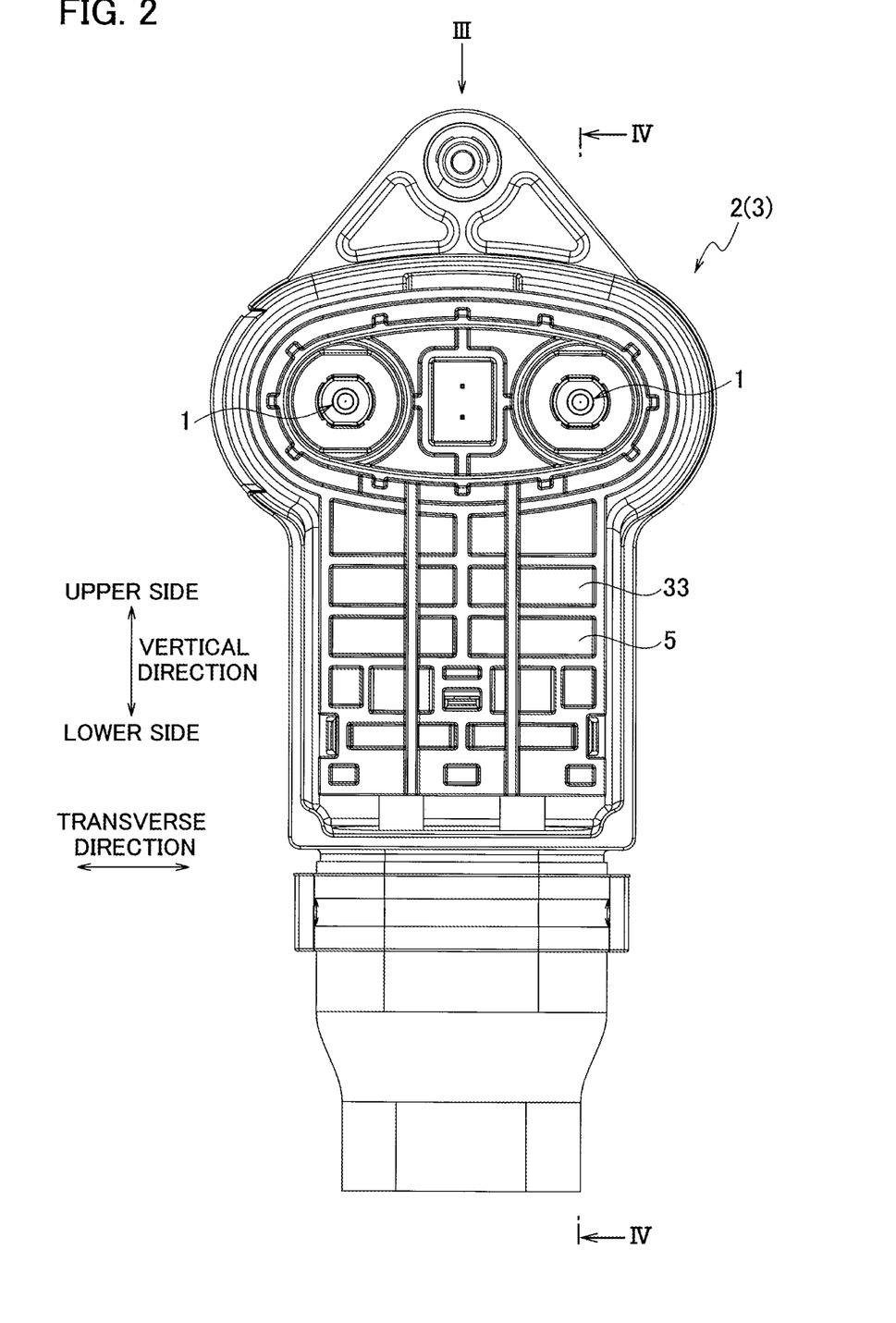
FIG. 2 is a II arrow view in FIG. 1.
Figure 3:
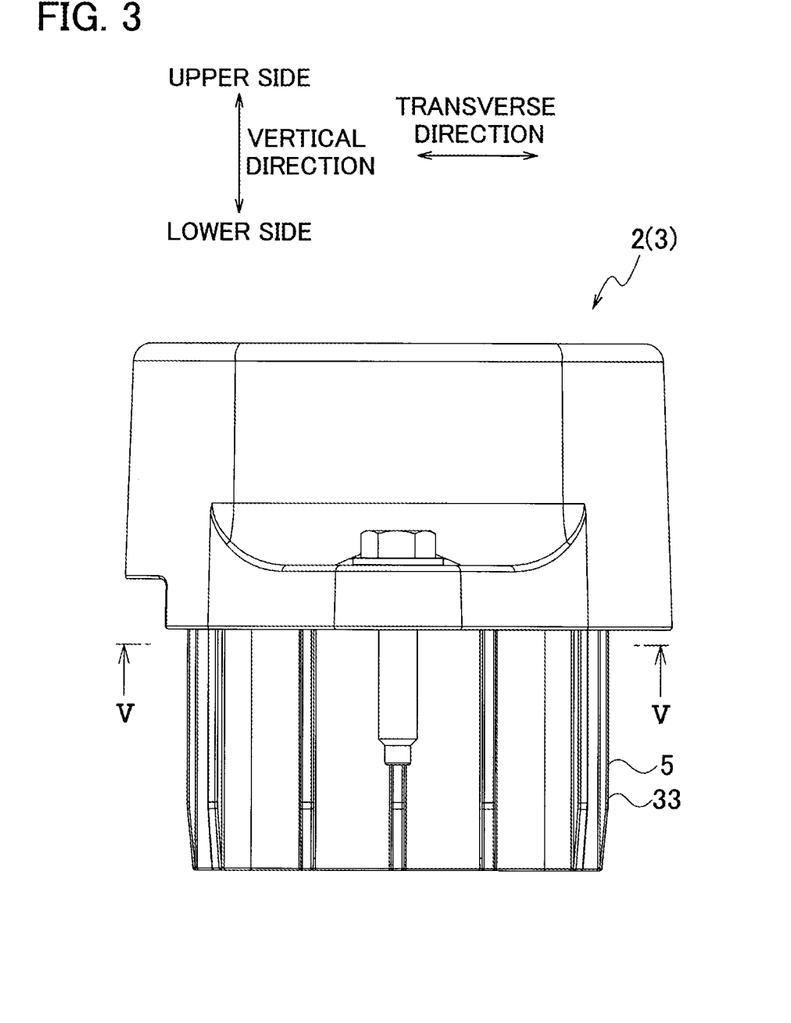
FIG. 3 is a III arrow view in FIG. 2.
Figure 4:
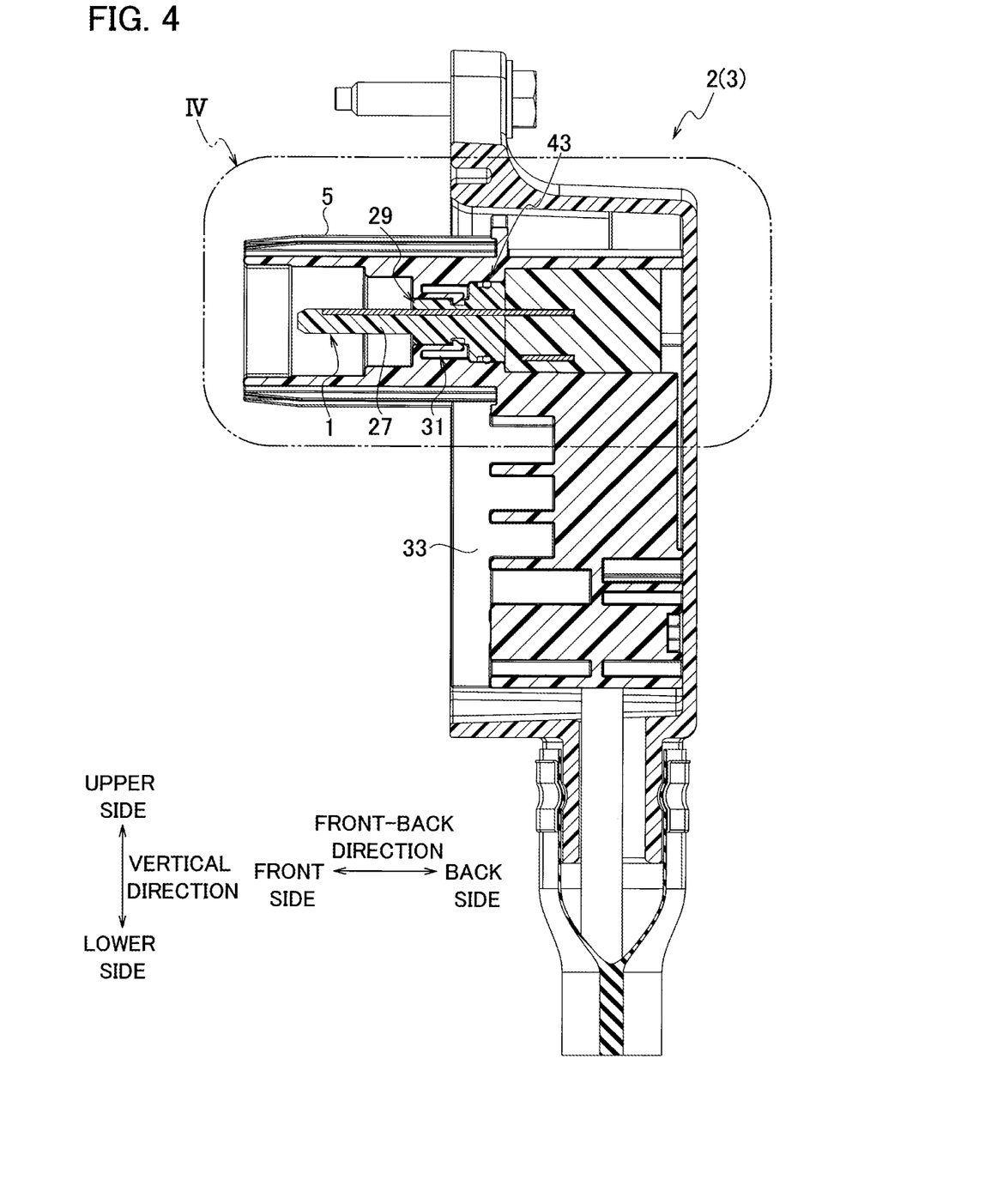
FIG. 4 is a IV-IV cross-sectional view in FIG. 2.
Figure 5:
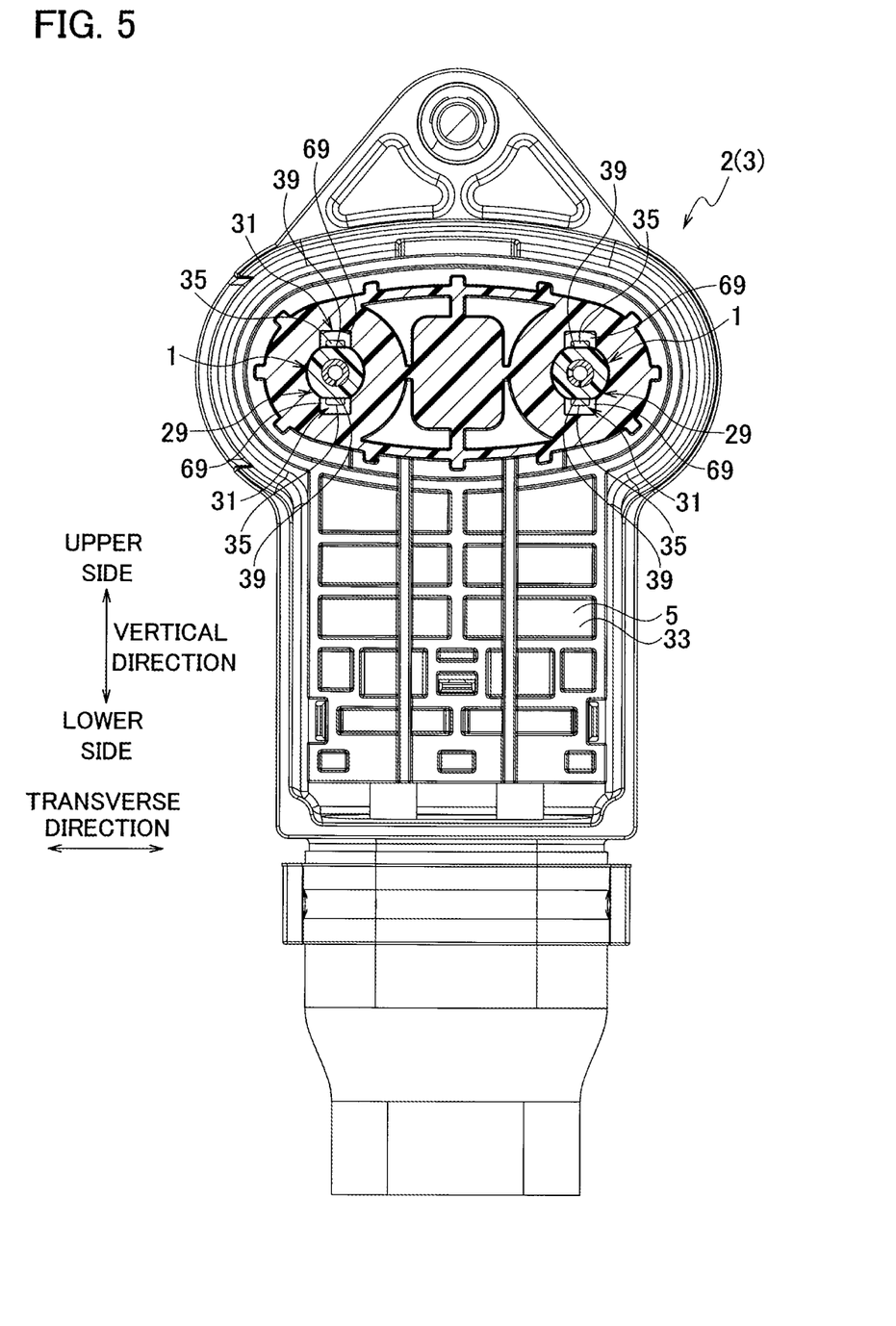
FIG. 5 is a V-V cross-sectional view in FIG. 3.
Figure 6:
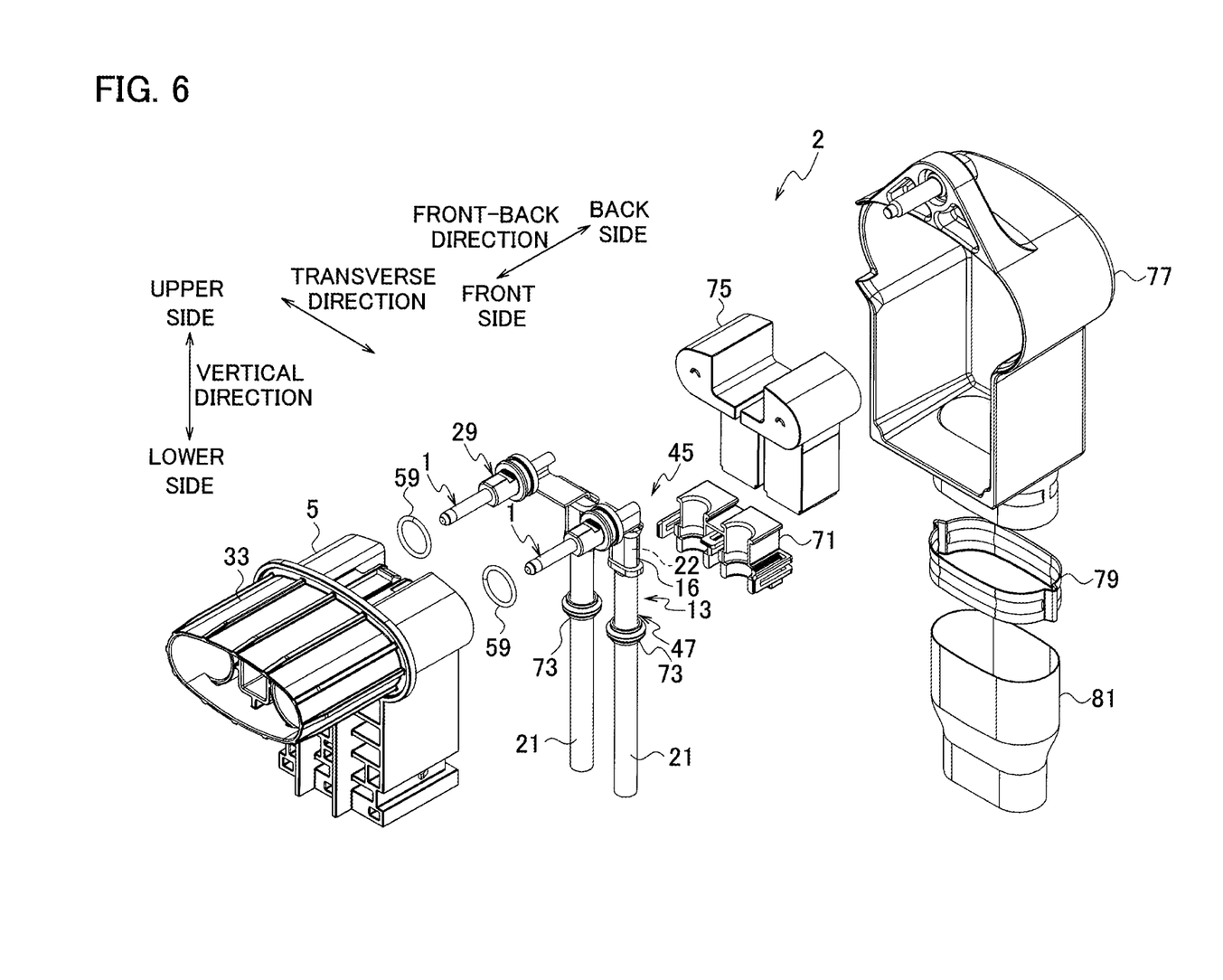
FIG. 6 is an exploded perspective view of the terminals according to the embodiment of the present invention, and the housing.
Figure 7:
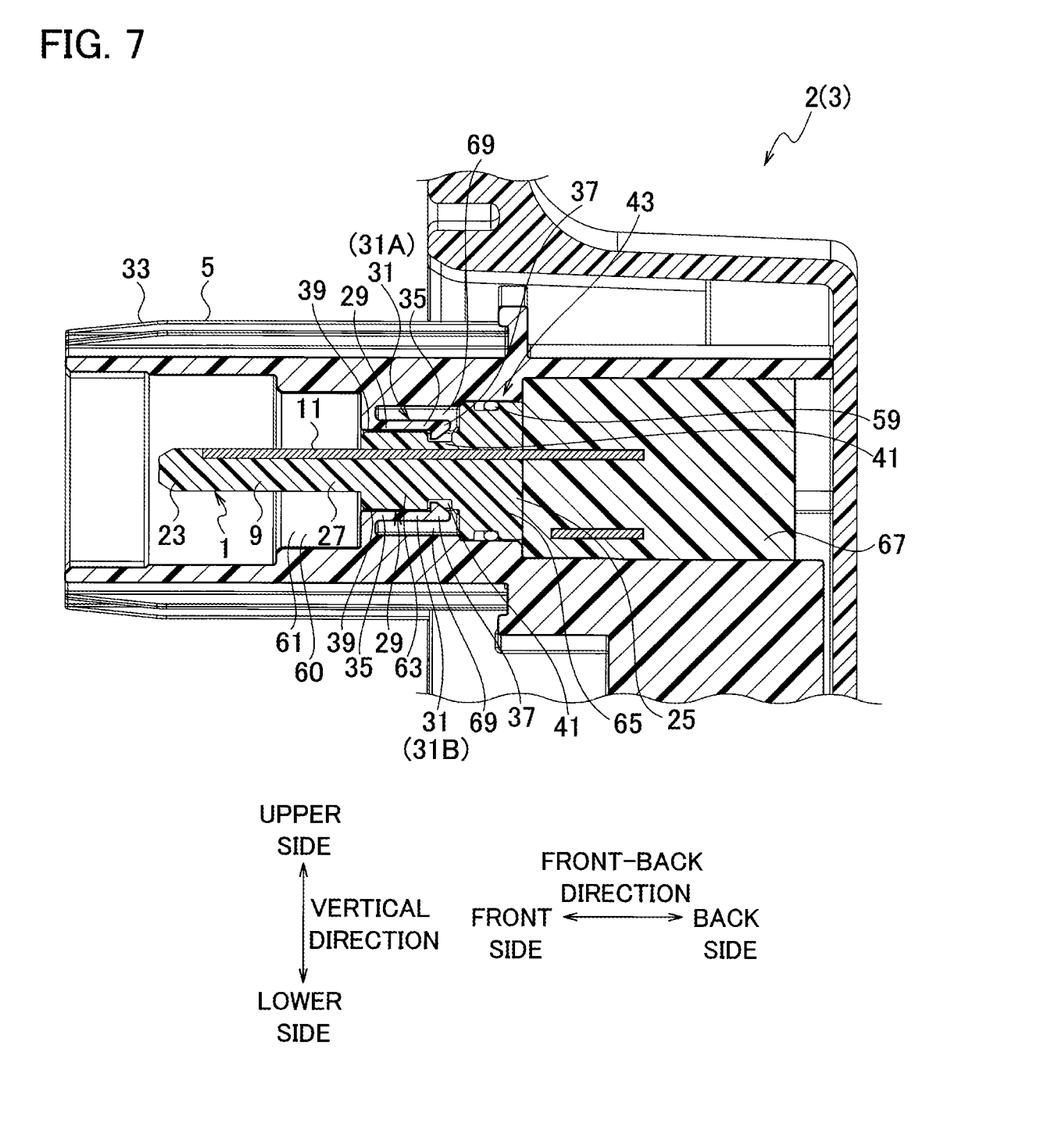
FIG. 7 is an enlarged view of a IV portion in FIG. 4.

Furthermore, as illustrated in FIG. 6, the connector 2 is provided with a rear holder 71, seal caps 73, a silicone filling portion 75, a shield shell 77, a shield ring 79 and a braided wire 81.

The rear holder 71 is attached to the housing 5, and holds the cable 21 which extends from the terminal 1 to the lower side together with the housing 5. The seal cap 73 is provided in the middle of the cable 21 which extends from the terminal 1 to the lower side to form the silicone filling portion 75. The silicone filling portion 75 is formed in a space around the terminal main body 7 of the terminal 1, and a silicone resin is filled in this space. In addition, other resins may be filled instead of the silicone resin.

The shield shell 77 is attached to the housing 5 to close (cover) an opening portion on the rear side of the housing 5. The shield ring 79 is used to fix to the shield shell 77 the terminal 1 and the braided wire 81 which covers the cables 21 extending from the shield shell 77.

Next, an assembly process of the connector 2 will be described.

First, the cable 21 is fixed to the terminal 1, the sealing member 59 is attached into the annular recess portion 57 of the second columnar part 51 of the terminal 1, and this terminal 1 is installed into the housing 5. In this case, as described above, the locking portions 31 of the housing 5 prevent rotation of the terminal 1.

Subsequently, the rear holder 71 and the seal caps 73 are attached to the housing 5. In a state where this attachment is finished, the cable 21 penetrates the seal cap 73, and the cable 21 and the seal cap 73 are sandwiched by the rear holder 71 and the housing 5 so as to be integrated with the housing 5. The rear holder 71 is fixed to the housing 5 so as to be integrated with the housing 5.

Subsequently, the front-back direction illustrated in each drawing is a perpendicular direction, and the housing 5 and the terminal 1 change postures such that the front side is a lower side and the rear side is an upper side. Furthermore, a thermosetting liquid silicone resin is injected and the liquid silicone resin is cured to form the silicone filling portion 75. In addition, when the liquid silicone resin is injected, the postures of the sealing member 59, the seal cap 73, the housing 5 and the terminal 1 prevent leakage of the liquid silicone resin to an outside of the housing 5. The silicone filling portion 75 is formed, so that airtightness of the terminal 1 is secured.

Subsequently, the shield ring 79 is used to fix the braided wire 81 to the shield shell 77 and fix this shield shell 77 to the housing 5. The shield shell 77 is fixed to the housing 5 by an unillustrated lock portion.

According to the terminal 1, the rotation prevention portion 29 which is engaged with the locking portions 31 formed in the housing 5 to prevent rotation of the terminal 1 is formed on the terminal holding portion 25. Consequently, when the terminals 1 are installed in the housing 5, the terminals 1 do not rotate with respect to the housing 5, and can be easily fixed in the housing 5, so that it is possible to prevent fixation in the housing 5 in a wrong manner.

Furthermore, according to the terminal 1, the rotation prevention portion 29 includes the first engaged portion 39 which is engaged with the locking claw portions 37 of the locking portions 31 in the state while the terminal 1 is being fixed in the housing 5, and the second engaged portion 41 which is engaged with the locking claw portions 37 of the locking portions 31 when installing of the terminal 1 in the housing 5 is finished, and prevents detachment of the terminal 1 from the housing 5. Consequently, both while the terminal 1 is being fixed in the housing 5 and at a point of time at which installing of the terminal 1 in the housing 5 is finished, the terminal 1 is prevented from rotating with respect to the housing 5.

Furthermore, when installing of the terminal 1 in the housing 5 is finished, the arm portions 35 of the locking portions 31 of the housing 5 engage with the first engaged portion 39, so that the terminal 1 is prevented from rotating. Furthermore, it is possible to more reliably prevent rotation of the terminal 1 at a point of time at which installing of the terminal 1 in the housing 5 is finished.

Furthermore, according to the terminal 1, when seen from the movement direction (front-back direction) of the terminal 1 for installing the terminal 1 in the housing 5, the locking portions 31 of the housing 5 and the rotation prevention portion 29 of the terminal 1 are located inside the sealing portion 43, so that it is possible to avoid an interference between the locking portions 31 of the housing 5 and the sealing portion 43, and secure the sealing property between the housing 5 and the terminal 1 at a point of time at which installing of the terminal 1 in the housing 5 is finished.

Furthermore, the housing 5 provided with the locking portions 31 is integrally formed, so that the configuration of the housing 5 is simplified.

In addition, as is understandable from each drawing, a plurality of (e.g., two) terminals 1 is fixed to the one housing 5. However, the one terminal 1 may be configured to be fixed to the one housing 5.

Furthermore, the above embodiment has described the case where the terminal 1 is applied to the connector 2 of the charging inlet device 3, yet is not limited to this, and is naturally applicable to other terminals.

What is claimed is:
1. A terminal comprising:
 a terminal main body having an electrical conductivity, and including a contact portion; and
 an insulation member including a terminal holding portion arranged on a rear end side of the contact portion and held in a housing,
 wherein the terminal holding portion includes a rotation prevention portion engaged with a locking portion formed in the housing to prevent rotation of the terminal in the housing,
 the locking portion of the housing includes an arm portion and a locking claw portion which is formed at a distal end of the arm portion, and
 the rotation prevention portion includes
  a first engaged portion engaged with the locking claw portion in a state while the terminal is being installed into the housing, and
  a second engaged portion engaged with the locking claw portion when installing of the terminal into the housing is finished, and preventing detachment of the terminal from the housing.
2. The terminal according to claim 1, wherein
 the terminal holding portion is provided with a sealing portion which seals between the housing and the terminal holding portion when the terminal is installed in the housing, and
 when seen from a movement direction in which the terminal is installed in the housing, the locking portion of the housing and the rotation prevention portion are located on inside the sealing portion.

3. The terminal according to claim 1, wherein
a communication portion which extends in an axial direction is formed inside the contact portion of the terminal main body, and
the insulation member includes
a distal end insulation portion which protrudes toward a front of a distal end of the contact portion, and
an intermediate resin portion which is arranged at the communication portion and couples the distal end insulation portion and the terminal holding portion.

4. The terminal according to claim 1, wherein
a communication portion which extends in an axial direction is formed inside the contact portion of the terminal main body, and
the insulation member includes
a distal end insulation portion which protrudes toward a front of a distal end of the contact portion, and
an intermediate resin portion which is arranged at the communication portion and couples the distal end insulation portion and the terminal holding portion.

5. The terminal according to claim 2, wherein
a communication portion which extends in an axial direction is formed inside the contact portion of the terminal main body, and
the insulation member includes
a distal end insulation portion which protrudes toward a front of a distal end of the contact portion, and
an intermediate resin portion which is arranged at the communication portion and couples the distal end insulation portion and the terminal holding portion.

6. A terminal comprising:
a terminal main body which includes a cylindrical portion, a core holding portion which holds a cable core, and a coupling portion which is located between the cylindrical portion and the core holding portion, and couples the cylindrical portion and the core holding portion; and
an insulation member which includes a rear end insulation portion which is provided to a rear end portion of the cylindrical portion of the terminal main body and a front end portion of the coupling portion of the terminal main body, and covers the rear end portion of the cylindrical portion of the terminal main body and the front end portion of the coupling portion of the terminal main body, wherein
the rear end insulation portion includes a first columnar part which is located on a side opposite to the core holding portion, and a second columnar part which is located on a side of the core holding portion,
a pair of first planar portions are formed at a front side portion, the front side portion being located on a side of the first columnar part opposite to the core holding portion, the pair of first planar portions being parallel to a center axis of the first columnar part, being parallel to each other and being mutually symmetrical with respect to the center axis of the first columnar part, and
a pair of second planar portions are formed at a rear side portion, the rear side portion being located at the first columnar part on the side of the core holding portion, the pair of second planar portions being parallel to the first planar portions and being mutually symmetrical with respect to the center axis of the first columnar part, and a value of a distance between the pair of second planar portions is smaller than a value of a distance between the pair of first planar portions.

7. The terminal according to claim 1, wherein
the terminal main body includes a cable connection portion configured to electrically connect with a cable.

* * * * *